United States Patent [19]

Ellison

[11] 4,242,801
[45] Jan. 6, 1981

[54] BOWLING BALL GAUGE

[76] Inventor: John D. Ellison, 2451 W. 234 St., Torrance, Calif. 90501

[21] Appl. No.: 19,097

[22] Filed: Mar. 9, 1979

[51] Int. Cl.³ .............................................. G01B 5/25
[52] U.S. Cl. .................................. 33/174 F; 273/63 B
[58] Field of Search ..................... 33/174 F; 273/63 R, 273/63 B, 63 F

[56] References Cited

U.S. PATENT DOCUMENTS

| 2,706,338 | 4/1955 | Ackerman et al. | 33/174 F |
| 3,389,475 | 6/1968 | Sapelak | 33/174 F |
| 3,392,453 | 7/1968 | Snoddy | 33/174 F |

Primary Examiner—Willis Little
Attorney, Agent, or Firm—Donald D. Mon

[57] ABSTRACT

A gauge to measure and to indicate the divergence of the axis of a bore in a bowling ball from a radius of the bowling ball. This enables the orientation of grip holes in one bowling ball to be measured so they can faithfully be reproduced in another bowling ball. The gauge includes a reference plate which is to be pressed against the outside of the ball, a plug pivoted to the reference plate which enters a bore and expands so as to bear against its inside wall to align the plug, and a pointer mounted to the plug which, with a scale on the reference plate, indicates the relationship between the bore and the radius of the bowling ball. This in formation enables one to set up a drilling machine to reproduce this hole in another ball.

2 Claims, 3 Drawing Figures

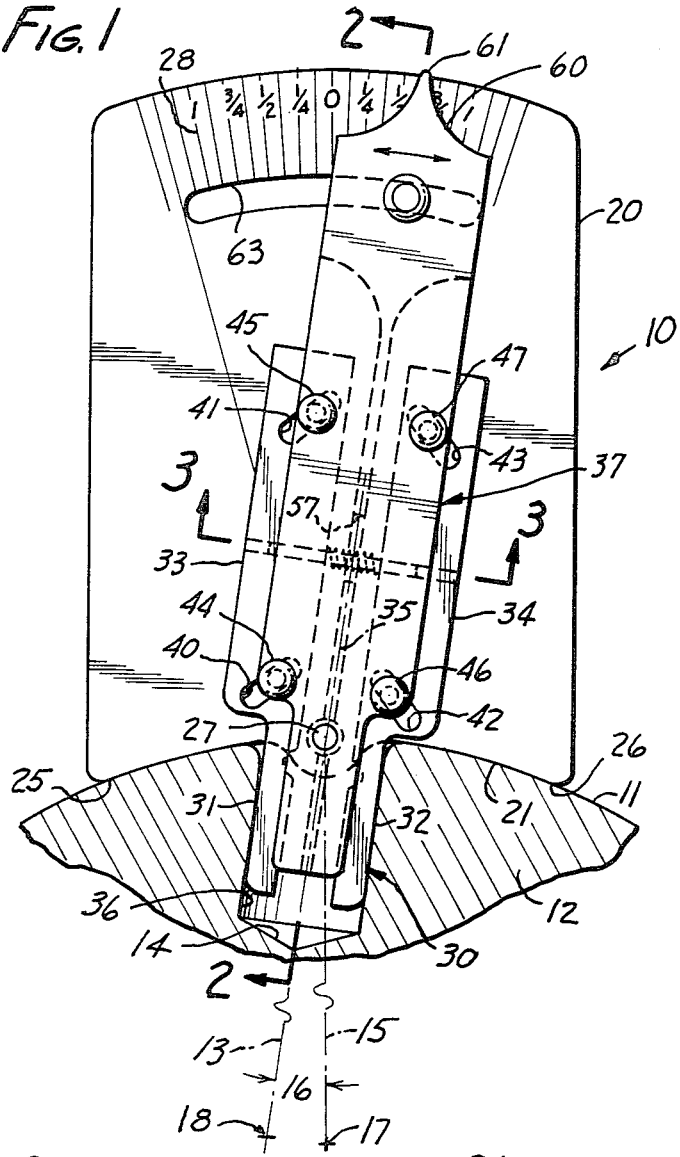
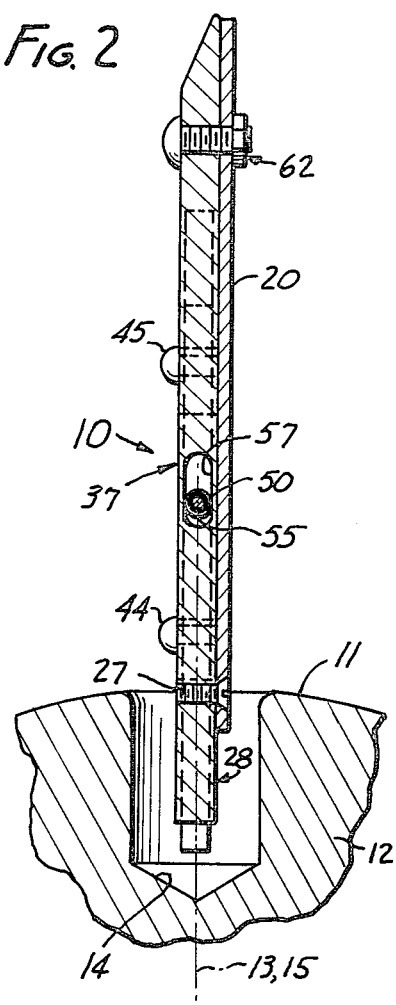
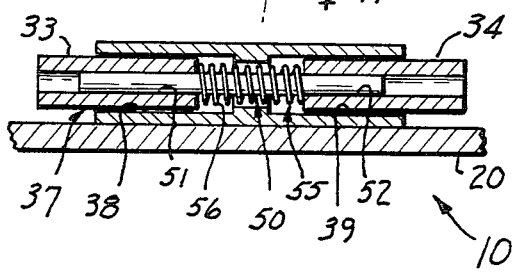

BOWLING BALL GAUGE

BACKGROUND OF THE INVENTION

This invention relates to a gauge to measure and indicate the divergence of the axis of a bore in a bowling ball from a radius of the bowling ball.

Persons familiar with the bowling art are aware that the finger grip holes are drilled in bowling balls at selected distances from one another and at selected angles which best suit the grip of an individual user. In order properly to drill these holes in a bowling ball, it is necessary to know their spacing apart, and also to know their orientation relative to a true radius where they intersect the surface of the ball. In the trade it is customary to read out these dimensions and to set up drilling machinery either as a function of angles, or more usually as the number of inches by which the axis of the bore misses the center of the ball itself. This is of course a theoretical measurement because one has no access to this region, but is serves the purpose when used as a measurement convention.

It is an object of this invention to provide a gauge which can quickly and accurately measure the divergence of the axis of a bore from a radius of the bowling ball so as to provide a reading which can be set into a drilling machine for drilling a similar hole in another ball.

A gauge according to this invention includes a reference plate which has a pair of contact points for contacting the surface of the bowling ball. Between the contact points there is a pivot axis. These points and the pivot axis are substantially upon a surface having a radius approximately that of an average bowling ball. An expandable plug is pivotally mounted to the reference plate at said pivot point. This plug has an axis and pair of axially extending side walls. The side walls are substantially parallel to one another and are movable toward and away from one another while remaining substantially parallel so as to expand against and contact the inside wall of said bore. This action aligns the plug axis with the axis of the bore. A pointer is mounted to the plug and a scale is provided on the reference plate which cooperates to indicate the divergence, when the reference plate is in proper contact with the surface of the bowling ball.

According to a preferred but optional feature of the invention, the plug includes a frame and two contactors. Each contactor has a contact surface parallel to the axis of the plug, and bias means biases the contactor apart from one another so as to seek the wall of the bore.

The above and other features of this invention will be fully understood from the following detailed description and the accompanying drawings, in which:

FIG. 1 is a side elevation partly in cut away cross-section showing the presently preferred embodiment of the invention, measuring the divergence of a bore in a bowling ball;

FIG. 2 is a cross-section taken at line 2—2 in FIG. 1; and

FIG. 3 is a fragmentary cross-section taken at line 3—3 in FIG. 1.

In FIG. 1 there is shown the presently preferred embodiment of gauge 10 according to this invention. It is intended to measure the divergence at surface 11 of a bowling ball 12 between the axis 13 of a cylindrical bore 14 and a radius 15 of the ball. Axis 13 and radius 15 intersect on what would be the surface of the ball were the hole not formed. The divergence may be defined as the number of degrees in angle 16, or as schematically shown in FIG. 1, the distance between center 17 of the ball and the nearest approach point of axis 13 to this center. This of course is the point 18 where a line drawn from center 17 and perpendicular to axis 13 intersects the axis. Both of these techniques of read out are known and used in the art.

The gauge includes a reference plate 20 which is a flat metal plate which has an edge 21 that may be circularly arcuate. If it is circularly arcuate its radius of curvature should be approximate that of an average bowling ball. Because there is some variation of radius between bowling balls, especially when "seconds" are sold, this curvature should be selected to be that of a smallest ball in order that a pair of contact points 25, 26 will always be available to contact the surface of the ball. This may lead to some small theoretical errors but they are well within the tolerances of this system. These points lie on the plane of the reference plate. Of course there may be an infinite number of points on an arcuate line, or two points could be provided on projections, as extreme examples of variations of the invention.

A pivot axis 27 in the plate is normal to the reference plate and to the sheet of FIG. 1. It lies together with points 25, 26 upon a circle havng a diameter approximating that of an average bowling ball. The illustration shows the device measuring the divergence in a relatively smaller diameter bowling ball.

The reference plate also carries a scale 28 which is calibrated in units meaningful in setting up a drilling machine to reproduce the anularity of bore 14.

The gauge further includes an expandable plug 30 which has as its objective to enter into the bore and align itself therewith. For this purpose it has a pair of axially extending side walls 31, 32 which are formed on respective contactors 33, 34. These contactors are generally aligned with plug axis 35 so that side walls 31 and 32 are parallel therewith. It is the object of this construction to bias the contactors apart, maintaining the side walls parallel so that the side walls will expand until they make optimum self aligning contact with the inside wall 36 of the bore.

The expandable plug 30 includes a frame 37 with a pair of channels 38, 39 to receive the contactors in axial and lateral sliding relationship. For contactors, in turn, includes slots 40, 41, 42 and 43 which in set 40, 41 and set 42, 43 are parallel to one another the sets being oppositely inclined. They are also oblique to the plug axis.

Pin means 44, 45, 46, 47 extend across the frame and pass through respective slots 40, 41, 42 and 43. Their diameter is substantially equal to the width of the respective slots, and it will be seen that the relationship between the slots and the pin means maintains the respective contactors in parallel relationship to the plug axis.

In order to assure that each of the side walls 31, 32 has an identical excursion from the plug axis, there is provided guide means 50 in the form of a pin which is fitted in holes 51, 52 in contactors 33, 34. It is slideable in at least one of them. This guide means prevents shear-like movement from occurring between the two contactors.

Bias means 55 in the form of a coil spring 56 is opposed to and compressed by and between the two contactors. The guide means and the coil spring pass through an opening 57 in the frame. This opening has a substantial axial extent to that the guide means can move along this opening as required.

Pointer 60 is integral with the frame, and includes a point 61 to cooperate with the scale. A screw-nut fastener combination 62 passes through an arcuate slot 63 in the reference plate and also through the pointer so that it can be tightened down to hold the desired setting.

The use of this gauge should be evident from the foregoing. It is necessary in making the measurement to assure that one is operating in plane where the divergence is the greater. This can readily be determined by setting the gauge to the unique position where the gauge reads "zero", because at this time the axis of the hole and the said radius of the ball will be in a plane which is normal to that of the reference plate. Then the reference plate can be rotated 90°, and at that time with the side walls 31, 32 engaged against the inside wall of the bore, and with screw-nut combination 62 loose, and the contact points in contact with the ball, the gage will correctly indicate the divergence. To maintain the reading, fastener combination 62 can be tightened down and the gauge removed. This reading can then be set into a drilling machine to drill the correct hole in another ball.

It will be recognized that the contactors are a form of expanding parallelogram type movement which has as its objective maintaining the side walls 31, 32 parallel to each other and biased outwardly. It will be evident to persons skilled in the art that there are other ways of obtaining this result, although usually of greater complexity.

It will also be understood from an examination of FIG. 2, that the plane of the reference plate is somewhat offset from the plane which will be "felt" by the side walls 31, 32 of contactors 33 and 34. This will cause a relatively small geometrical error, but it is one which is desired can simply be compensated for in the readings or in the settings of the drilling machine. Generally it is so small that it can be ignored.

While a flat plate is the least expensive structure to provide the contact points, it is obviously possible to provide other structures such as forks, or even more than one not in the same plane, such as tripods, four-legged chairs, and the like. All of these means fall within the scope of this invention. Their method of usage is identical.

This invention provides a simple and useful device for measuring the divergence of holes in a bowling ball and provides information for setting a drilling device to reproduce the hole in another ball.

This invention is not to be limited by the embodiment shown in the drawings and described in the description, which is given by way of example and not of limitation, but only in accordance with the scope of the appended claims.

I claim:

1. A gauge for measuring the divergence at the surface of a bowling ball between the axis of a bore entering said ball at said surface and a radius of the ball which intersects said axis at said surface, said gauge comprising:

a reference member comprising a plate bearing at least a pair of contact points for contacting the surface of the bowling ball, and a pivot axis between and spaced from said contact points, said pivot axis being normal to said plate, said points and said pivot axis lying substantially upon a surface having a diameter approximating that of an average bowling ball;

an expandable plug pivotally mounted to the reference member at said pivot point, said plug having a plug axis which is coincident with said bore axis when inserted in said bore and comprising a frame and two contactors, each contactor having a contact surface parallel to said plug axis, said contact surfaces being substantially parallel to one another, and movable toward and away from one another while remaining substantially parallel so as to expand against and contact the inside wall of said bore, said ball radius passing through said pivot axis when said plug is in said bore and said points bear against said surface of said bowling ball, and bias means intermediate said contactors for biasing said contactors apart from one another;

alignment means comprising a pair of parallel slots in each contactor, said slots being axially spaced apart from one another and oblique to said plug axis, the slots of opposite contactors being directly opposed to one another and oppositely inclined, and pin means mounted to said frame and engaging in each of said slots, and further including a shaft normal to the plane of said contact surfaces and spaced from said pivot axis and entering both of said contactors, said shaft cooperating with said biasing means so as to prevent axial shear motion relative to them while permitting them to move toward and away from one another;

a pointer mounted to said plug; and a scale on said reference plate to cooperate with said pointer to indicate said divergence.

2. A gauge according to claim 1 in which said bias means is a spring wound around said shaft and in compression between said contactors.

* * * * *